United States Patent [19]

Bradley et al.

[11] 4,186,044
[45] Jan. 29, 1980

[54] APPARATUS AND METHOD FOR FORMING LAMINATED COMPOSITE STRUCTURES

[75] Inventors: Robert J. Bradley, Seattle; William A. Hainsworth, Bellevue, both of Wash.

[73] Assignee: Boeing Commercial Airplane Company, Seattle, Wash.

[21] Appl. No.: 865,089

[22] Filed: Dec. 27, 1977

[51] Int. Cl.² .................. B29C 19/04; B32B 19/02; H05B 9/06
[52] U.S. Cl. .................. 156/273; 156/380; 219/10.55 A
[58] Field of Search ........... 156/272, 273, 380, 324; 219/10.55 A

[56] References Cited

U.S. PATENT DOCUMENTS

| 2,871,911 | 2/1959 | Goldsworthy et al. | 156/380 |
| 3,567,544 | 3/1971 | Nichols | 156/273 |
| 3,597,567 | 8/1971 | Johnson | 219/10.55 A |
| 3,765,985 | 10/1973 | Siard et al. | 156/380 |
| 3,769,127 | 10/1973 | Goldsworthy | 156/273 |
| 3,793,108 | 2/1974 | Goldsworthy | 156/273 |
| 4,012,267 | 3/1977 | Klein | 156/324 |

Primary Examiner—Douglas J. Drummond
Attorney, Agent, or Firm—Morris A. Case; Bernard A. Donahue

[57] ABSTRACT

A device for continuously pressurizing and curing resin impregnated multilayered reinforcements into an elongated laminated composite structure. The layer passes through a multi-segmented die located in an opening in a microwave applicator or curing chamber. The chamber is pneumatically pressurized to exert pressure on the die segments.

35 Claims, 9 Drawing Figures

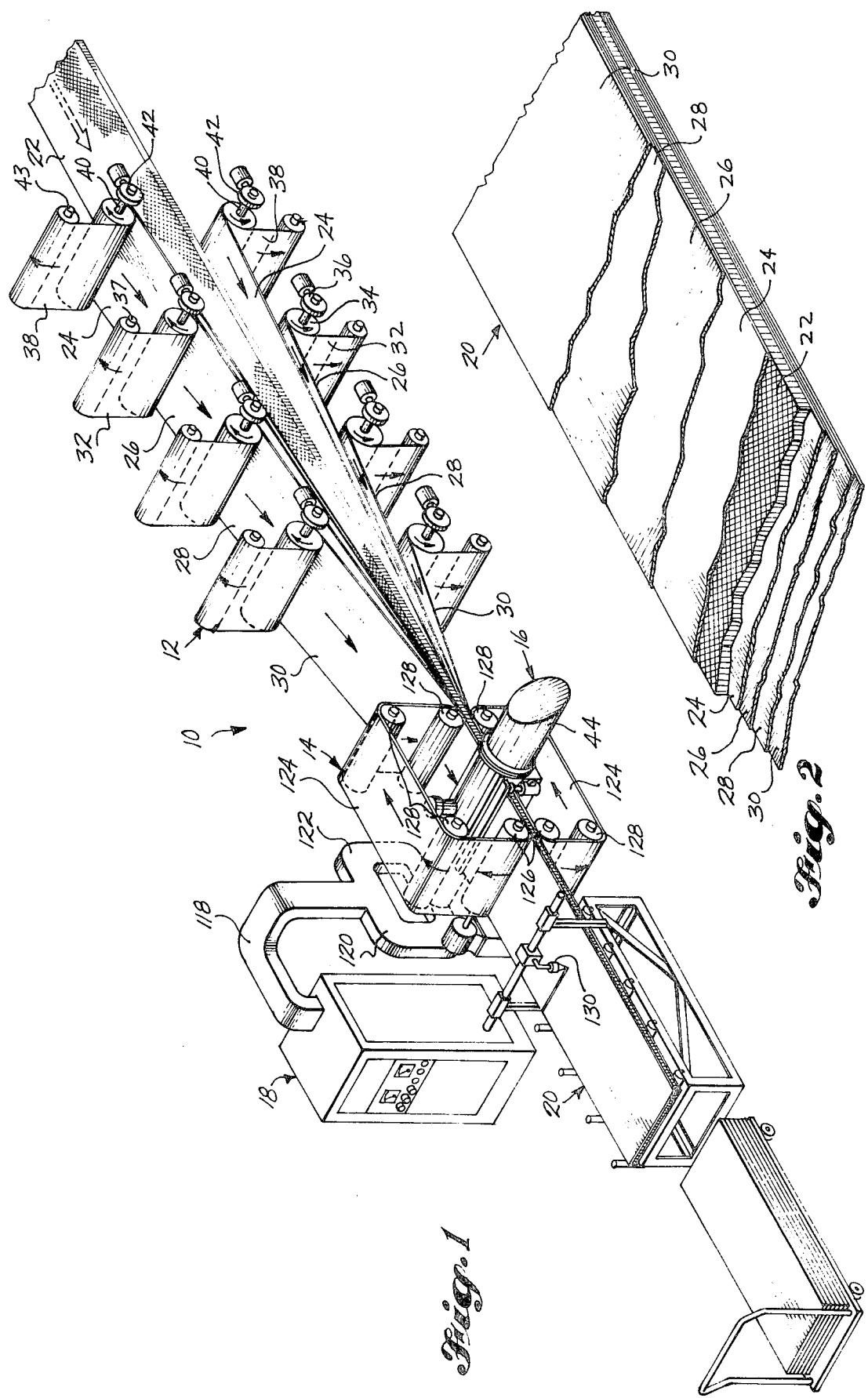

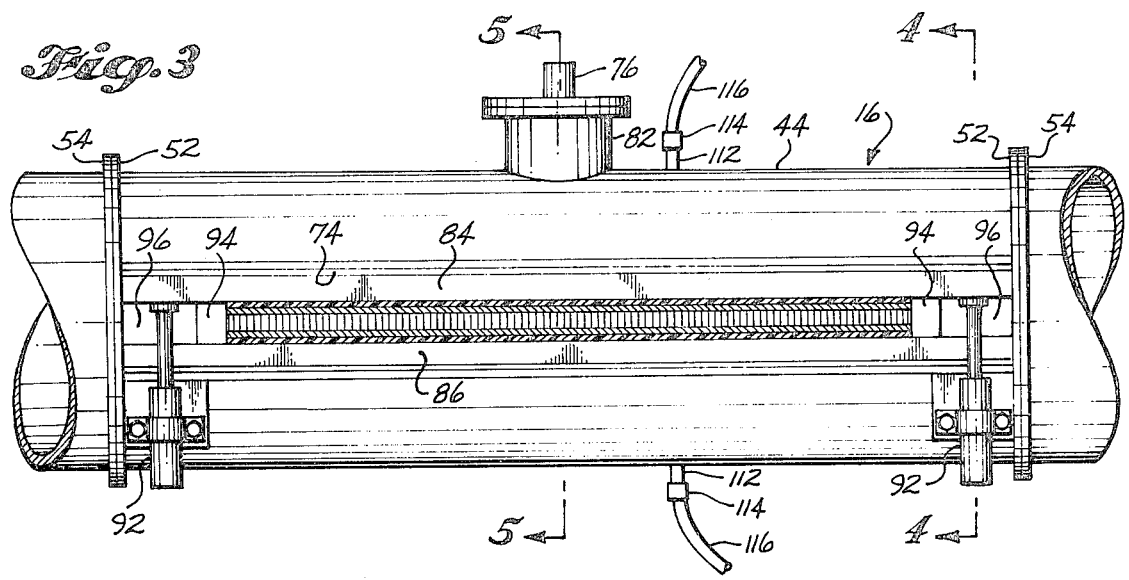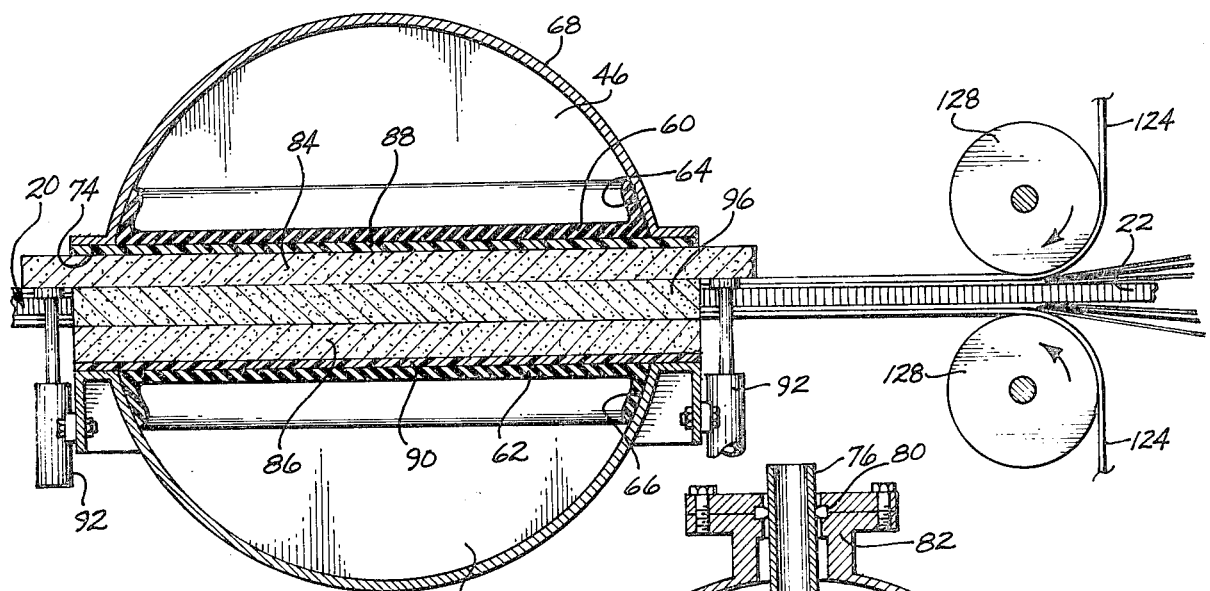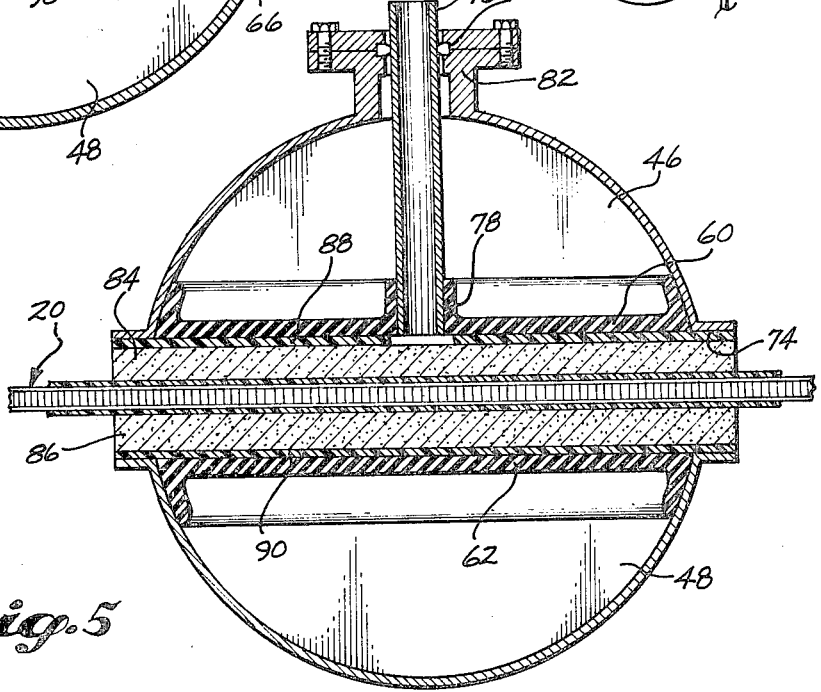

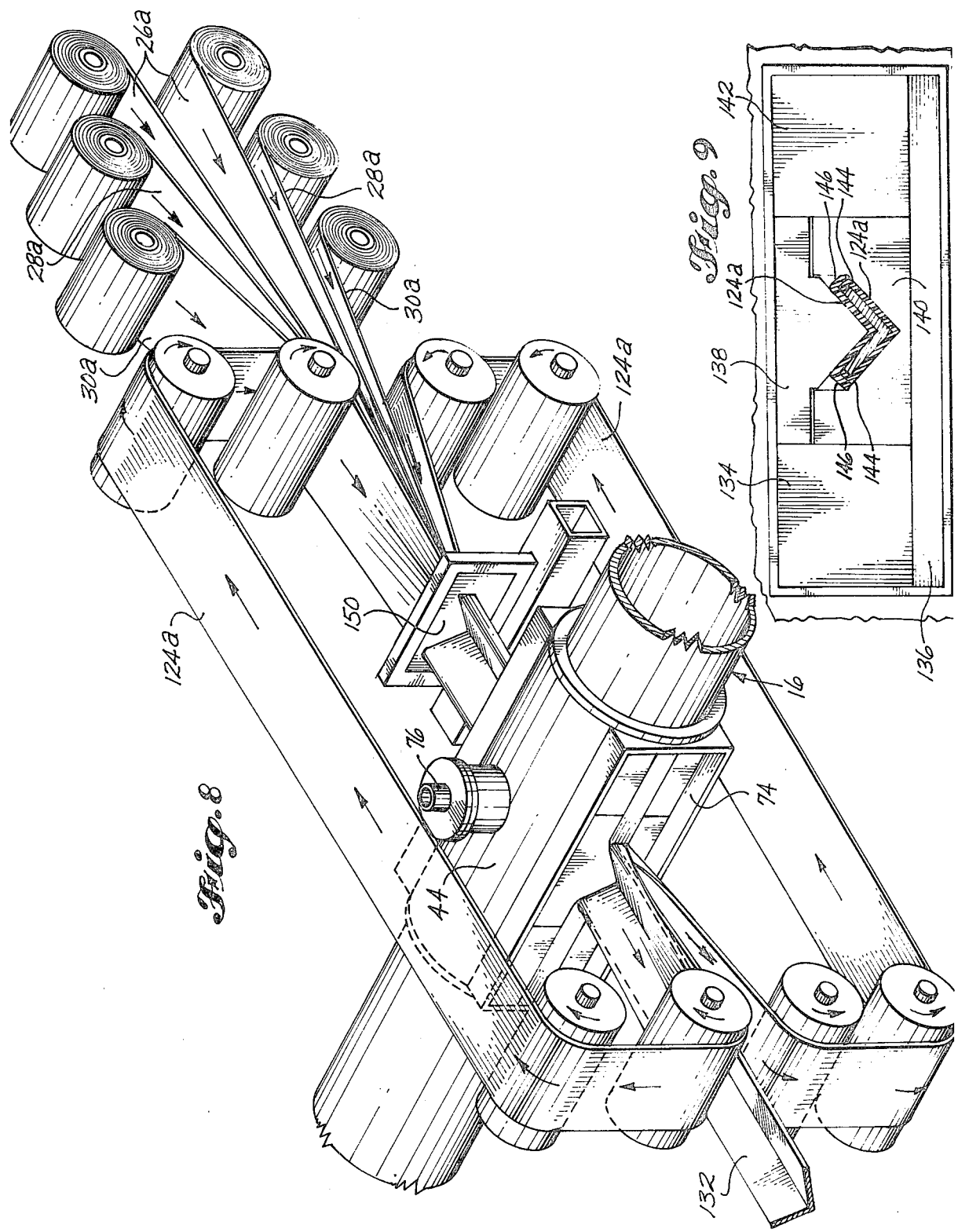

APPARATUS AND METHOD FOR FORMING LAMINATED COMPOSITE STRUCTURES

BACKGROUND OF THE INVENTION

The usual methods of preparing a laminated panel structure are slow and expensive. Layers of material are laid up by hand in a mandrel which is then placed in an autoclave for a considerable length of time to effect a cured laminate.

In U.S. Pat. No. 3,056,440 to Mello, plywood was made in a continuous process using a two drum press with each drum of a plurality of pneumatically inflated tires placed coaxially side by side and having laterally extending metal bars on the outer tread that are electrically heated when in contact with the plywood.

U.S. Pat. No. 3,808,968 shows a press for curing conveyor belt ends using a pair of platens with a plurality of U-shaped cross-members joined at the ends and each having a rubber hose in the U-member to apply pressure to the platens. A conveyorized system was discovered that will continuously form an elongated composite laminate.

SUMMARY OF THE INVENTION

Rolls of structurally reinforcing material are formed into layers and run through a microwave curing applicator to be continuously formed into a laminate. The layers are fed through the applicator with a pair of slip belts that feed the material while sliding through dies located in the applicator. The dies are pneumatically pressurized to exert pressure while curing the laminate.

DESCRIPTION OF THE DRAWINGS

FIG. 1 shows a perspective view of an automated line for continuously preparing a laminate.

FIG. 2 shows an enlarged fragmented perspective view partially in section of the laminate build up as shown in FIG. 1.

FIG. 3 shows a fragmented side elevational view looking toward the inlet of the curing chambers of the automated line shown in FIG. 1.

FIG. 4 shows a fragmented sectional end view taken along line 4—4 of FIG. 3.

FIG. 5 shows another sectional end view taken along line 5—5 of FIG. 3.

FIG. 8 shows a perspective view of the automated line of this invention forming a shaped composite.

FIG. 9 shows a fragmented side elevational view looking toward the inlet to the curing chamber die section of FIG. 8.

DETAILED DESCRIPTION

Figure 6:
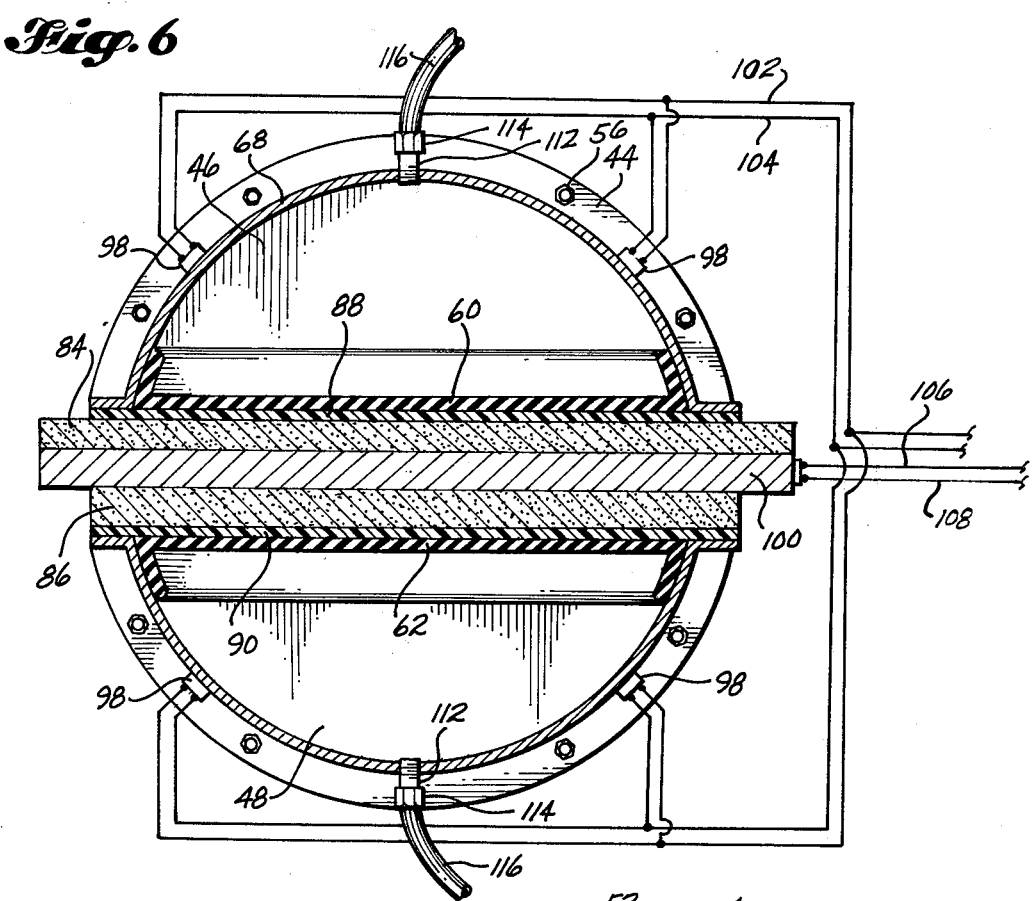
FIG. 6 is yet another sectional end view of the curing chambers showing the pre-heating arrangement for the curing chambers.
Figure 7:
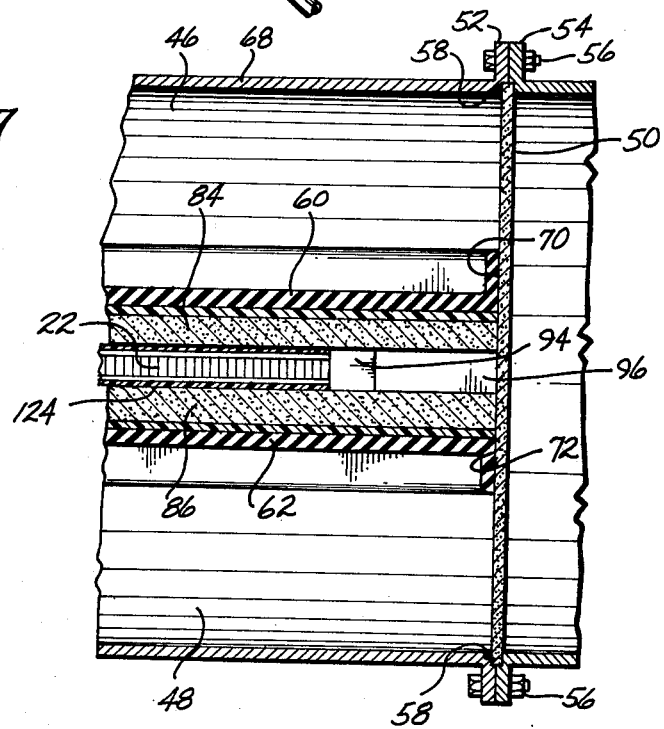
FIG. 7 shows a fragmented side elevation sectional view of a side of the curing chambers.

The conveyorized laminating machine 10 has a roll unreeling section 12, feed section 14, curing section 16, and a microwave generator 18 to provide energy to the curing section. In FIG. 1 a composite laminate 20 having a non-metallic honeycomb core 22 is being formed. The honeycomb core is prepared from any of the reinforced plastics, such as, but not limited to, a nylon fiber treated with a heat resistant phenolic resin sold under the trade name of Nomex. The layers, in addition to the honeycomb core, include an epoxy adhesive layer 24, and graphite fibers preimpreganted with an epoxy resin in layers 26, 28 and 30. These reinforcing layers may be unidirectional, woven, or multidirectional with the fiber combination at zero, forty-five and ninety degrees. A light weight glass scrim is used when the multidirectional fibers are at plus or minus 45 degrees to prevent fiber distortion during the pultrusion. The reinforcing materials are not limited to graphite, but may be any other known reinforcing fibers such as boron or glass, and various resins may be used. The resin may be applied after the fibers are unrolled, however, it is preferable they be preimpregnated with the resin to assist in handling and to closely control the ratio of resin to fiber. The preimpregnated reinforcing layer is rolled up with a layer of easily separating material such as a release treated cloth or paper. Each reinforcing layer is handled in the same manner and will be understood by reference to reinforcing layer 26. A roll made up of the reinforcing layer 26 and separating layer 32 is placed on roller 34 which has its rotation controlled by air actuated slip clutch 36. Alternately a mechanical disc brake may be used. The separating layer 32 meanwhile is wound around wind up roller 37 which will collect said separating layer as the reinforcing layer is unwound. The adhesive layer 24 is a resin partially cured in what is commonly called "advanced to the 'B' stage" to permit flowing sufficient to contact edges of and to be bonded to the honeycomb core without flowing into and filling the cells of the honeycomb. This adhesive layer comes on a roll made up of the adhesive layer and separating layer 38 which is placed on a roller 40 which has its rotation controlled by an air actuated slip clutch 42. The separating layer meanwhile is wound up on roller 43. Alternatively the adhesive layer may be pre-applied to the core by roller coating or it may be dispensed with and a bond obtained between the reinforcing layers and the honeycomb core by use of the resin advanced to the "B" stage in the preimpregnated reinforcing layer.

The curing section 16, as best shown in FIGS. 3 through 7 consists of a microwave applicator or curing chamber 44 through which microwave energy is directed. The chamber, preferably of a cylindrical shaped aluminum, is divided into a pair of compartments 46 and 48. The compartments are bounded on the sides by radially extending disc-shaped walls 50. These walls of a material essentially transparent to microwaves, such as quartz or aluminum oxide, are clamped by a pair of flanges 52 and 54; which in turn are secured by bolts 56. An O-ring seal 58 provides an air tight seal. Resilient barrier diaphragms 60 and 62 are sealingly adhered at 64 and 66 respectively to the side 68 of the chamber, and to the sidewalls 50 at 70 and 72. These two compartments are spaced apart along a plane of the centerline of the chamber to form an opening 74 through the chamber. The resilient material is essentially transparent to microwaves and was prepared of a silicone rubber. A sight tube 76 to permit use of a line of sight infrared radiation pyrometer extends through compartment 46. The tube is adhesively joined to resilient member 60 at 78 and is sealed off with O-ring seal 80 located in collar 82.

The opening 74 through the chamber and between the two compartments 46 and 48 and sidewalls 50 provide a space for dies used to contour layers of material passing through the chamber. In FIGS. 1 and 3 through 5, the dies comprise a pair of platens 84 and 86 used in combination with a pair of shims 88 and 90, all of which are essentially transparent to microwaves. The platens are preferably of quartz or aluminum oxide and the shims are of tetrafluoroethylene. The upper platen is of a length to extend outside the chamber where a set of four cylinders 92, actuated by a source of compressed air, not shown, will raise the upper platen to provide a means for allowing layers of composite material to be introduced between the platens. Before the composite materials are entered, and while the cylinders are holding the upper platen up, side spacers 94 and 96 may be placed in the opening. Alternatively the side spacers may be left out as it is not imperative the sides be contained when curing honeycomb cored panels.

To prevent rejection of the first part of a run due to the heat sink effect in the walls of the curing chamber and in the platens, FIG. 6 shows a means of preheating to prevent such rejection. Strip heaters 98 are placed along the wall 68 of the chamber 44, and panel heater 100 is placed between and in contact with the platens. Electrical energy, from a source not shown, flows to the strip heaters along the wall through electrical conductive lines 102 and 104 and to the between platens panel heater through lines 106 and 108.

Pipe nipples 112, with couplings 114, are joined to and extend through the wall 68 of the chamber 44. Air hoses 116 connect to the couplings and provide means for directing compressed air through a pressure regulator from a compressed air source, neither of which are shown. It is preferable the hoses be innerconnected as it is desireable to have the same pressure in each compartment.

Microwave energy from the microwave generator 18 flows through waveguide 118, and dividing ducts 120 and 122 thence into the chamber 44.

As pressure is applied to the compartments it is transmitted through the resilient members, and the platens into the layers of starting material or layup as it passes through the chamber to form and cure the layup to become the laminated composite structure 20. The platens remain stationary as the layup passes by. The layup is fed through the chamber by continuous belts 124. The belts actually pull the laminate composite through the platens by means of the friction force developed between the belts and the laminate composite when pneumatic pressure is maintained. These belts are of a material essentially transparent to microwaves, have lubricity to act as a slip surface passing by the platens, and act as a parting agent to prevent resin build-up. A fiber reinforced tetrafluoroethylene material was used. The feed belts are synchronized by drive rolls 126 and kept tight and aligned with idler rolls 128. The elongated laminated composite structure may be cut to length by any known means such as, but not limited to, a water jet cutter 130 illustrated in FIG. 1.

In FIGS. 8 and 9 the same curing section 16 with chamber 44 having opening 74 is used to continuously form an angle-shaped composite structure 132. A multi-section die of ceramic type material such as quartz or aluminum oxide is used with the die made up of part numbers 134, 136, 138, 140 and 142. Layers 26a, 28a and 30a of reinforcing fibers preimpregnated with a resin are placed between feeder belts 124a then through the shaping die in the chamber. A pre-shaping forming die 150 is used ahead of the chamber to bring the feeder belts with the multilayered layup to the angle shape before it enters the chamber. The feeder belts are turned over at the edges at 144 and 146, as best shown in FIG. 9, to encase the fiber reinforced layers as they move through the chamber. It is not desired to limit the shape of the formed elongated composite structural members to an angle shape as various shapes may be formed by use of the proper die.

To fabricate an elongated composite laminate, as shown in FIGS. 1 through 7, platen 84 is raised by cylinders 92, panel heater 100 placed between the platens, and electrical energy turned on to all the heaters until the chamber 44 and the platens 84 and 86 are up to temperature. This temperature will be selected based on the core and face materials in combination with the resins used, and will be determined with a pyrometer sighting through sight tube 76 onto platen 84. The honeycomb core, adhesive and reinforcing layers are placed between the feed belts 124 and under the platens. The top platen is lowered, air pressure introduced into compartments 46 and 48, the microwave generator 18 turned on, drive rolls 126 started and slip clutches 36 and 42 adjusted to continuously and automatically produce the elongated composite structural member.

We claim:

1. An apparatus for forming an elongated laminated structural member from a plurality of rolls of starting materials some of which contain uncured adhesive resins, the apparatus comprising: means for layering up material from rolls of starting material, slip means for feeding the layered material through a pressurized die in an energized microwave applicator chamber to cure an adhesive resin in the layered material to form an elongated laminated structural member, and pneumatic means for applying pressure through the die to the layered material while the slip means feeding the layered material slides through the die in the chamber to control the dimensions of the laminate during the curing.

2. An apparatus for forming an elongated composite structure comprising: means for applying adjustable tension to resist unrolling of each of a plurality of aligned rolls of forming material, means for feeding the forming material in a multilayer form through a microwave applicator chamber, stationary die means within the applicator chamber for controlling contours of the multilayer as it passes through the chamber, means for energizing the chamber to cure adhesive resins included in the multilayer forming material to set up the adhesive and form an elongated composite structure emerging from the chamber, and the means for feeding the forming material through the chamber includes means for slipping through the stationary die means for controlling the contours of the multilayer.

3. An apparatus for forming an elongated composite structure as in claim 2 further comprising pneumatic means for exerting pressure on the stationary die means for controlling contours.

4. An apparatus for forming an elongated composite structure as in claim 2 wherein the stationary die means for controlling contours are platens for imparting sandwich shape to the composite structure.

5. An apparatus for forming an elongated composite structure as in claim 2 wherein the stationary die means for controlling contours impart varied shapes to the composite structure, and forming means for pre-shaping the multilayered material to match the die are located ahead of the stationary die means.

6. An apparatus for forming an elongated composite structure as in claim 3 wherein the stationary die means for controlling contours are platens for imparting sandwich shape to the composite structure.

7. An apparatus for forming an elongated composite structure as in claim 3 wherein the stationary die means for controlling contours include die means for imparting varied shapes to the composite structure, and forming means ahead of the die means for pre-shaping the multilayered material as it moves to the die means.

8. A process for conveyorized formation of an elongated composite structure, the steps comprising: extending dies that are transparent to microwaves through a microwave curing chamber, selecting feed belts that have lubricity and are transparent to microwaves, passing the feed belts through the dies, aligning a plurality of rolls of reinforcing materials at least some of which are preimpregnated with a thermosetting resin, placing the reinforcing materials in layered form between the feed belts, energizing to obtain microwaves in the curing chamber, applying pressure to the dies, and driving the feed belts to form and cure the reinforcing materials into an elongated composite structure as it emerges from the chamber.

9. A process for formation of an elongated composite structure as in claim 8, further steps comprising: applying controlled resistance to unrolling to the reinforcing materials.

10. A process for formation of an elongated composite structure as in claim 8, further comprises selecting pneumatics as the means for applying pressure to the dies.

11. A process for conveyorized formation of an elongated composite structure, the steps comprising: extending dies that are transparent to microwaves through a microwave curing chamber, forming the microwave curing chamber by placing members transparent to microwave as sides of the chamber, sealing it off top and bottom with a resilient material that is also transparent to microwaves, selecting feed belts that have lubricity and are transparent to microwaves, passing the feed belts through the dies, aligning a plurality of rolls of reinforcing materials at least some of which are preimpregnated with a thermosetting resin, placing the reinforcing materials in layered form between the feed belts, energizing to obtain microwaves in the curing chamber, introducing a gas into compartments formed behind the resilient material in the curing chamber to exert pressure on the dies, and driving the feed belts to form and cure the reinforcing materials into an elongated composite structure as it emerges from the chamber.

12. A process for formation of an elongated composite structure as in claim 11 further comprising sealingly installing a sight tube through a wall of one of the compartments and the resilient material for taking pyrometer readings on the surface of the die.

13. A process for formation of an elongated composite structure as in claim 11 further steps comprising selecting a non-metallic honeycomb as one of the rolls of reinforcing material, and locating the honeycomb within the layer of reinforcing materials to become a core of the elongated composite structure.

14. A process for formation of an elongated composite structure as in claim 12 further steps comprising selecting a non-metallic honeycomb as one of the rolls of reinforcing material, and locating the honeycomb within the layer of reinforcing material to become a core of the elongated composite structure.

15. A process for formation of an elongated composite structure as in claim 11, steps further comprising placing pre-shaping forms ahead of the dies to shape the layered reinforcing material before it enters the dies.

16. An apparatus for forming an elongated laminate from layers of non-metallic resin impregnated structural members as the members pass through an apparatus comprising: a microwave applicator chamber, means for compartmentalizing a section of the chamber into two sealed compartments having an opening extending between the compartments and through the chamber, means die within the opening layers of non-metallic structural members as they pass through the opening, means for applying pneumatic pressure from at least one of the compartments against the die means and means for introducing microwaves into the chamber.

17. An apparatus as in claim 16 further comprising means for pyrometric viewing of temperatures of the shaping means within the opening.

18. An apparatus for forming an elongated laminate from layers of non-metallic structural members, some of which are impregnated with a resin, as the members pass through the apparatus which comprises: a microwave curing chamber; a pair of sealed compartments within the chamber separated by a laterally extending opening, said compartments each having a resilient member contiguous to the opening; a pair of non-metallic platens between which layers of non-metallic resin containing structural members pass, and said platens extend through the opening; means for introducing air into the compartments for exerting pressure on the platens and thence the layered materials; and means for introducing microwaves into the chamber to cure the resin in the layered member to form a composite structural laminate as the member emerges from the microwave curing chamber.

19. An apparatus as in claim 18 further comprising a sight tube to sealingly extend through a wall and through the resilient member of one of the compartments to permit measuring temperature of the platen.

20. An apparatus as in claim 18 further comprising means for raising one of the platens to permit introducing the layered structural material.

21. An apparatus as in claim 18 further comprising a removable metal platen to be located between the non-metallic platens, and means for heating the metal platen to preheat the non-metallic platens.

22. An apparatus as in claim 18 further comprising a spacer to be located between each platen and its contiguous compartment.

23. An apparatus for forming an elongated laminate from layers of non-metallic structural members, some of which are impregnated with a resin, as the members pass through an apparatus which comprises: a microwave curing chamber having an opening through its sides, a pair of spaced apart laterally extending walls sealed to the chamber and selected from a material essentially transparent to microwaves, a pair of spaced apart longitudinally extending resilient members selected from a material essentially transparent to microwaves and the resilient members sealingly joined to the walls and the sides of the chamber to form a pair of spaced apart compartments separated by the opening, a die to extend through the opening and selected from a material essentially transparent to microwaves, means for generating microwaves in the chamber to cure resin in a resin impregnated nonmetallic structurally reinforced member passing through the dies, and means for pneumatically pressurizing the compartments to exert pressure on the die and thence pressure on the member as it is being cured in the die.

24. An apparatus as in claim 23 further comprising a tube selected from a material essentially transparent to microwaves, said tube to sealingly extend through one of the compartments and open end at the die to permit access for measuring the temperature of the die.

25. An apparatus as in claim 23 wherein the die comprises a pair of platens.

26. An apparatus as in claim 25 further comprising automatic means for raising one of the platens.

27. An apparatus as in claim 25 further comprising a spacer selected from a material essentially transparent to microwaves to be placed between each platen and the contiguous compartment.

28. An apparatus as in claim 26 further comprising means for preheating the platens.

29. An apparatus as in claim 24 wherein the die comprises a pair of platens.

30. An apparatus as in claim 29 further comprising automatic means for raising one of the platens.

31. An apparatus as in claim 29 further comprising a spacer selected from a material essentially transparent to microwaves to be placed between each platen and the contiguous compartment.

32. An apparatus as in claim 30 further comprising means for preheating the platens.

33. A method of continuously pressurizing and curing a layup of layered resin impregnated structural materials to form the layup into an elongated laminated composite structure, the steps comprising: passing layered resin impregnated structural material laterally through an opening in a microwave curing chamber, controlling contour of the layered material by restraining with a die that extends through the opening, pressurizing the die with pneumatic pressure acting through a contiguous elastic side of a pair of compartments located within the curing chamber, and introducing microwaves into the chamber.

34. A method as in claim 33, further steps comprising: locating a sight tube sealingly extending through one of the compartments and opening at the die, and monitoring temperature of the die with a pyrometer.

35. A method as in claim 33, further steps comprising: selecting a pair of platens as the die, and including a core of honeycomb among the layers of structural materials.

* * * * *